US009957635B2

(12) United States Patent
James

(10) Patent No.: US 9,957,635 B2
(45) Date of Patent: May 1, 2018

(54) METAL PLATING METHOD AND APPARATUS

(71) Applicant: Pratt & Whitney Canada Corp., Longueuil (CA)

(72) Inventor: Jerome James, Burkburnett, TX (US)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 198 days.

(21) Appl. No.: 14/264,467

(22) Filed: Apr. 29, 2014

(65) Prior Publication Data

US 2014/0231247 A1    Aug. 21, 2014

Related U.S. Application Data

(62) Division of application No. 13/076,812, filed on Mar. 31, 2011, now Pat. No. 8,747,639.

(51) Int. Cl.

| C25D 17/10 | (2006.01) |
|---|---|
| C25D 5/02 | (2006.01) |
| F01D 9/04 | (2006.01) |
| F01D 25/28 | (2006.01) |
| C25D 5/08 | (2006.01) |
| C25D 17/12 | (2006.01) |
| C25D 7/04 | (2006.01) |
| B33Y 80/00 | (2015.01) |
| B33Y 70/00 | (2015.01) |
| C25D 17/02 | (2006.01) |

(52) U.S. Cl.
CPC .............. *C25D 17/10* (2013.01); *C25D 5/026* (2013.01); *C25D 5/028* (2013.01); *C25D 5/08* (2013.01); *C25D 7/04* (2013.01); *C25D 17/12* (2013.01); *F01D 9/04* (2013.01); *F01D 25/28* (2013.01); *B33Y 70/00* (2014.12); *B33Y 80/00* (2014.12); *C25D 17/02* (2013.01); *F05D 2230/90* (2013.01)

(58) Field of Classification Search
CPC ........ C25D 17/10; C25D 5/026; C25D 17/04; C25D 17/12; C25D 17/02
See application file for complete search history.

(56) References Cited

U.S. PATENT DOCUMENTS

| 3,535,211 A | 10/1970 | Frowde |
|---|---|---|
| 4,010,083 A | 3/1977 | Bakker et al. |
| 4,065,303 A | 12/1977 | Seilstorfer et al. |
| 4,405,411 A | 9/1983 | Inoue et al. |

(Continued)

FOREIGN PATENT DOCUMENTS

| EP | 2105520 | 9/2009 |
|---|---|---|
| GB | 2318588 | 4/1998 |

OTHER PUBLICATIONS

Partial European Search Report.
Extended European Search Report.

*Primary Examiner* — Stefanie S Wittenberg
(74) *Attorney, Agent, or Firm* — Norton Rose Fulbright Canada LLP

(57) ABSTRACT

An apparatus and a method suited for metal plating aircraft engine components that allows the creation a local environment for plating by covering a localized area to be plated so that the localized area to be plated is sealed from remaining parts of the component, thereby eliminating the need for masking remaining parts of the component prior to plating.

10 Claims, 5 Drawing Sheets

(56) References Cited

U.S. PATENT DOCUMENTS

| | | | |
|---|---|---|---|
| 4,750,981 A * | 6/1988 | Dalland | C25D 5/02 |
| | | | 204/224 R |
| 5,073,237 A | 12/1991 | Bacher et al. | |
| 5,109,589 A | 5/1992 | Cramer et al. | |
| 5,162,078 A | 11/1992 | Bley et al. | |
| 5,641,391 A | 6/1997 | Hunter et al. | |
| 5,865,976 A | 2/1999 | Takeuchi et al. | |
| 6,251,250 B1 | 6/2001 | Keigler | |
| 6,377,661 B1 | 4/2002 | Guru et al. | |
| 6,413,404 B1 | 7/2002 | Ihara et al. | |
| 6,458,913 B1 * | 10/2002 | Honigfort | B29C 45/0001 |
| | | | 264/176.1 |
| 6,460,594 B1 | 10/2002 | Lam | |
| 6,517,698 B1 * | 2/2003 | Johnson | C25D 5/08 |
| | | | 205/148 |
| 6,543,134 B2 | 4/2003 | Meier | |
| 6,800,187 B1 | 10/2004 | Reid et al. | |
| 6,841,339 B2 | 1/2005 | Morales | |
| 6,881,869 B1 | 4/2005 | Jacquot | |
| 6,929,733 B2 | 8/2005 | Domeier et al. | |
| 7,045,089 B2 | 5/2006 | Afromowitz | |
| 7,087,143 B1 | 8/2006 | Schmidt et al. | |
| 7,247,222 B2 | 7/2007 | Yang et al. | |
| 7,267,756 B2 | 9/2007 | Nitta et al. | |
| 7,575,664 B2 | 8/2009 | Matsuda et al. | |
| 7,655,117 B2 | 2/2010 | Zielke | |
| 2002/0000380 A1 * | 1/2002 | Graham | C25D 17/001 |
| | | | 205/102 |
| 2003/0057096 A1 | 3/2003 | Morales et al. | |
| 2003/0217929 A1 | 11/2003 | Peace | |
| 2003/0221953 A1 | 12/2003 | Oberlitner et al. | |
| 2004/0104119 A1 | 6/2004 | Edelstein | |
| 2005/0115826 A1 | 6/2005 | Nitta et al. | |
| 2007/0281103 A1 | 12/2007 | Khan et al. | |
| 2008/0047829 A1 | 2/2008 | Ogawa | |
| 2010/0134949 A1 * | 6/2010 | Choi | H02N 11/002 |
| | | | 361/301.2 |

* cited by examiner

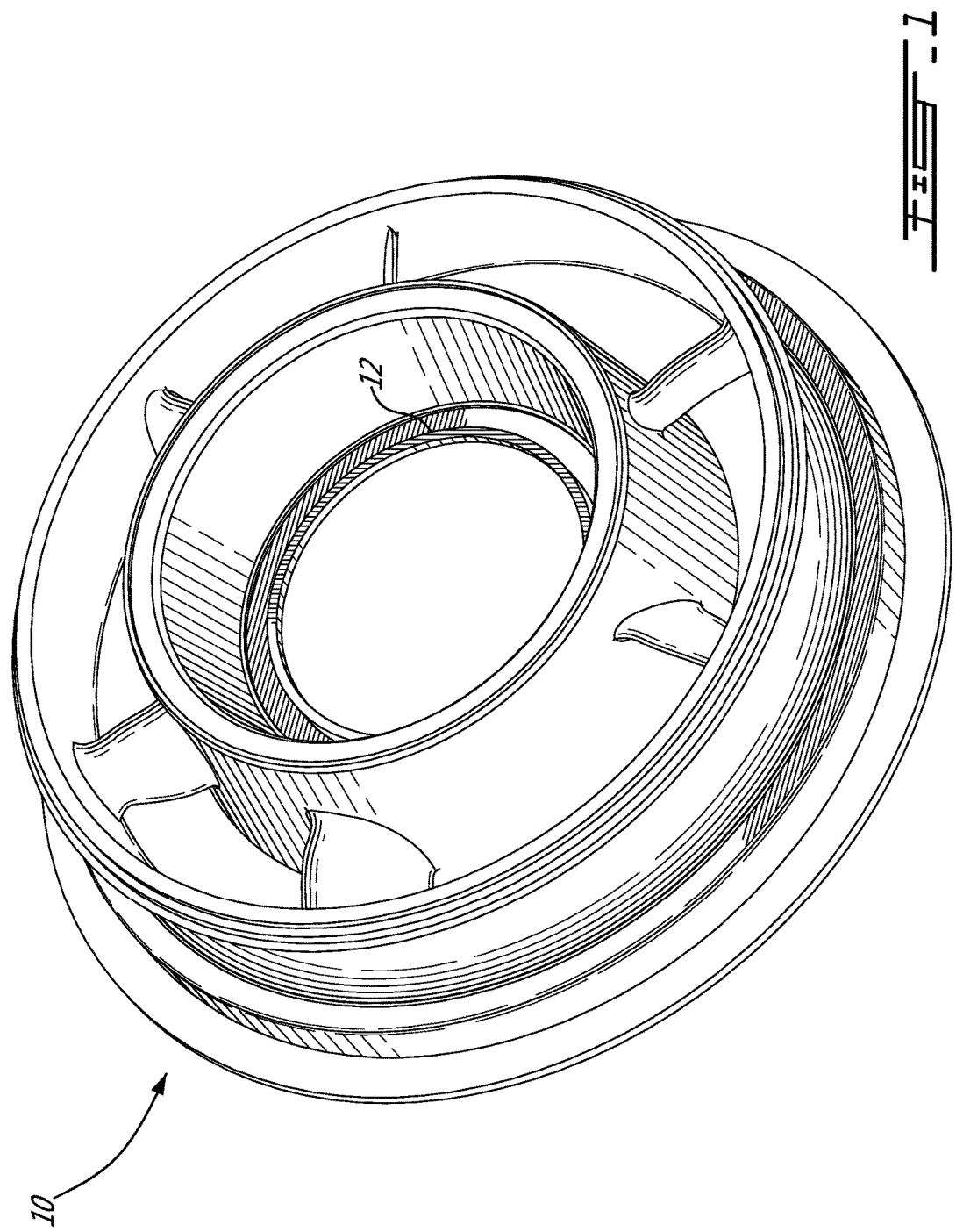

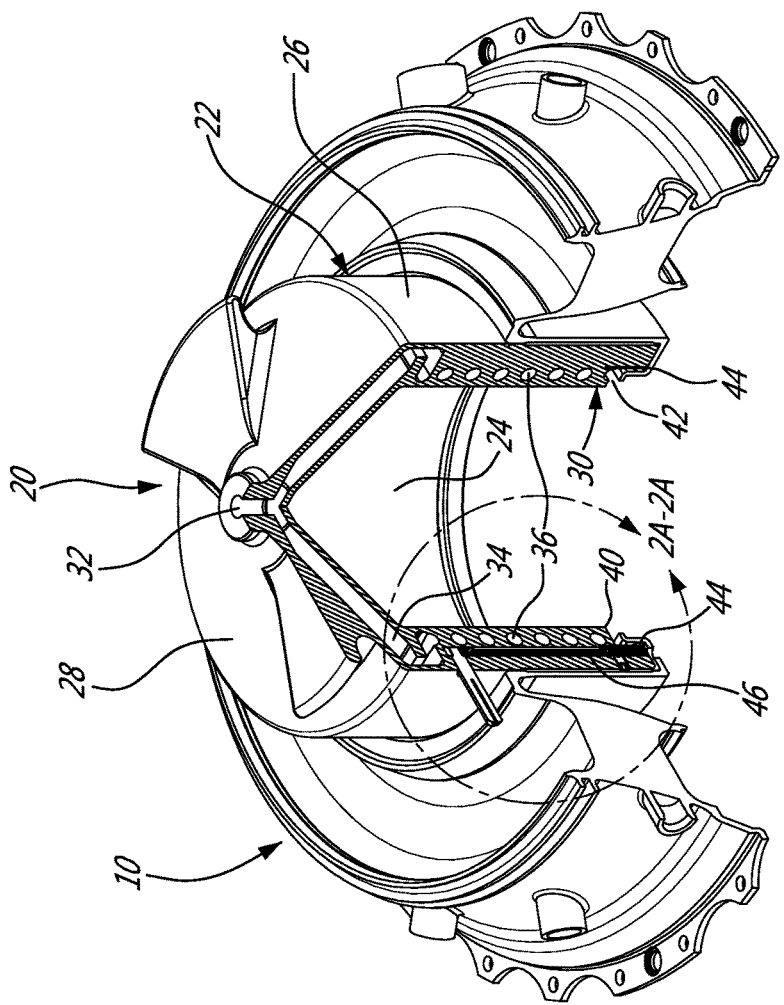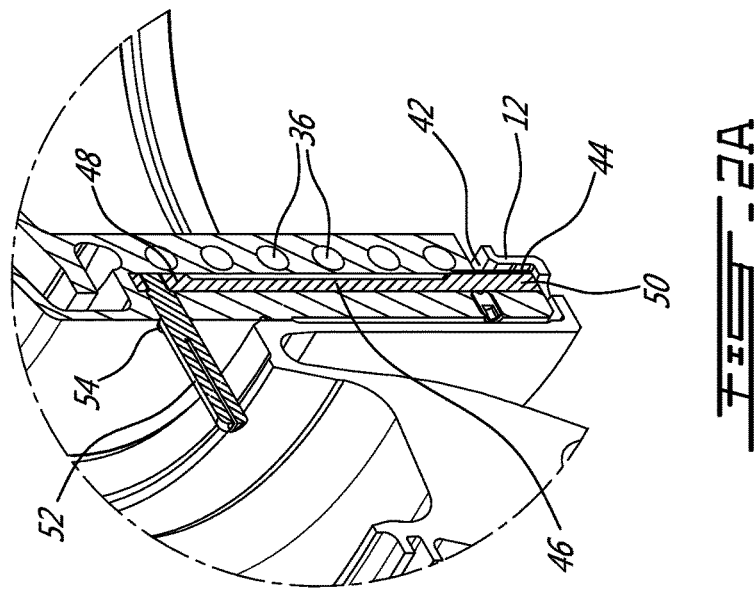

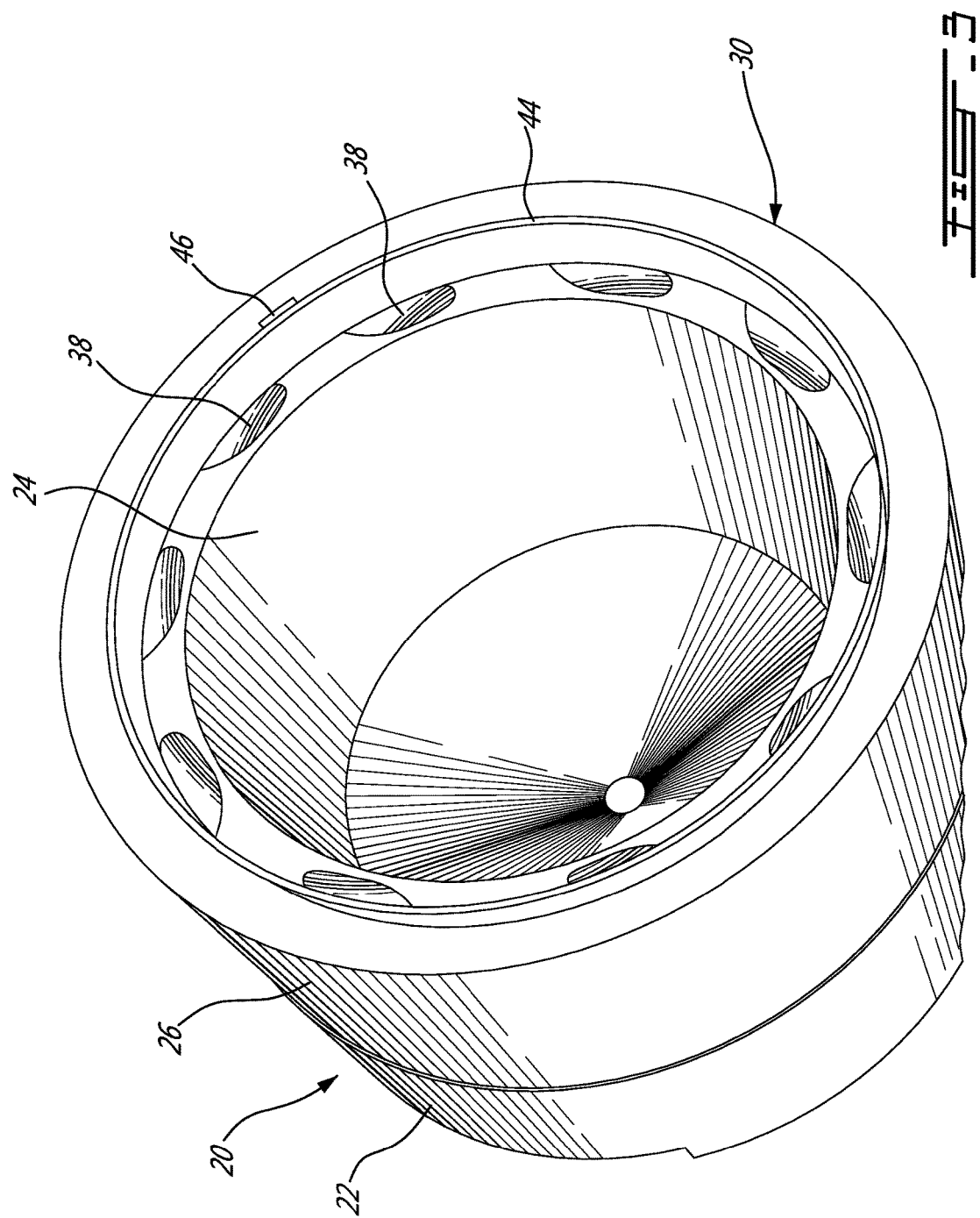

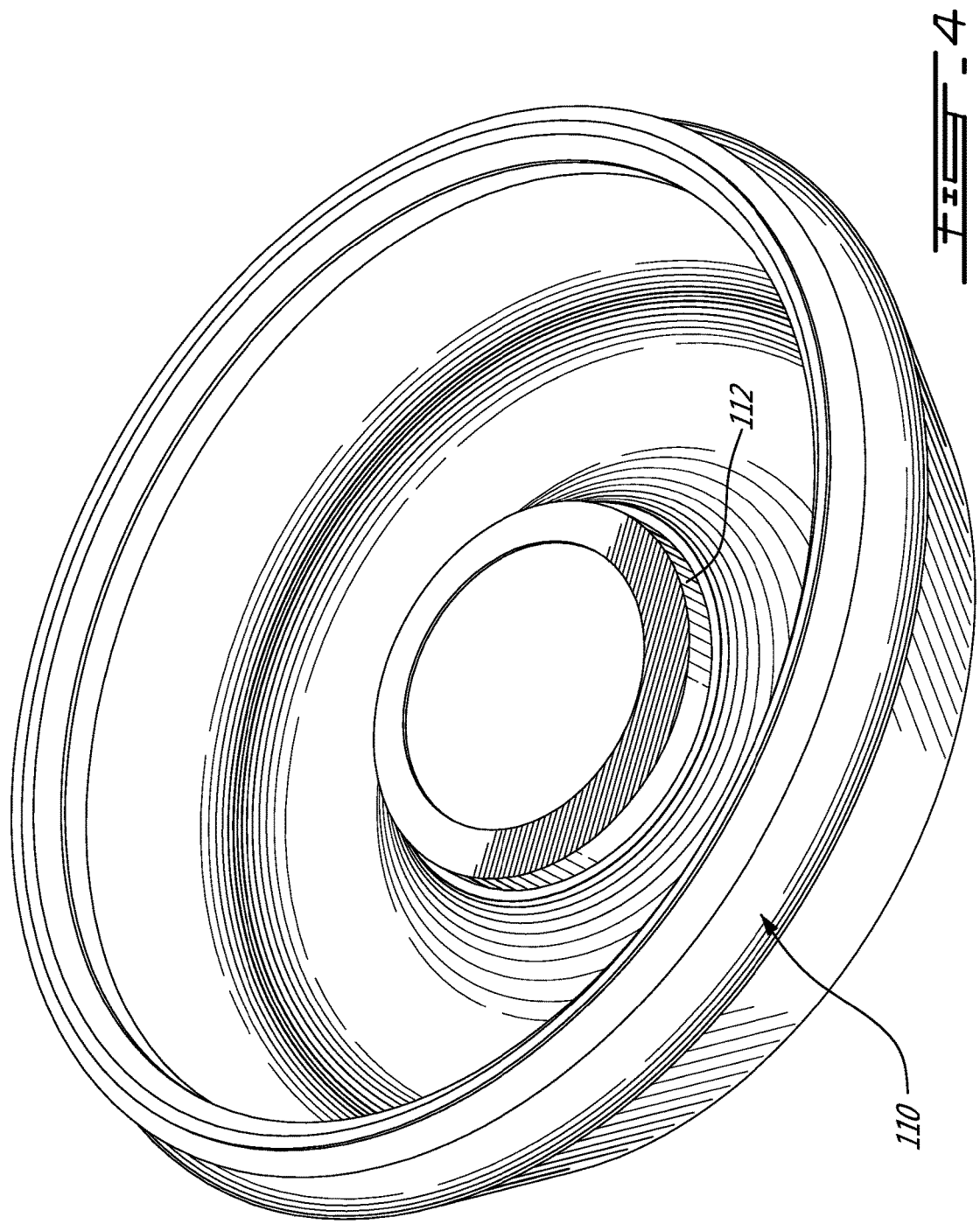

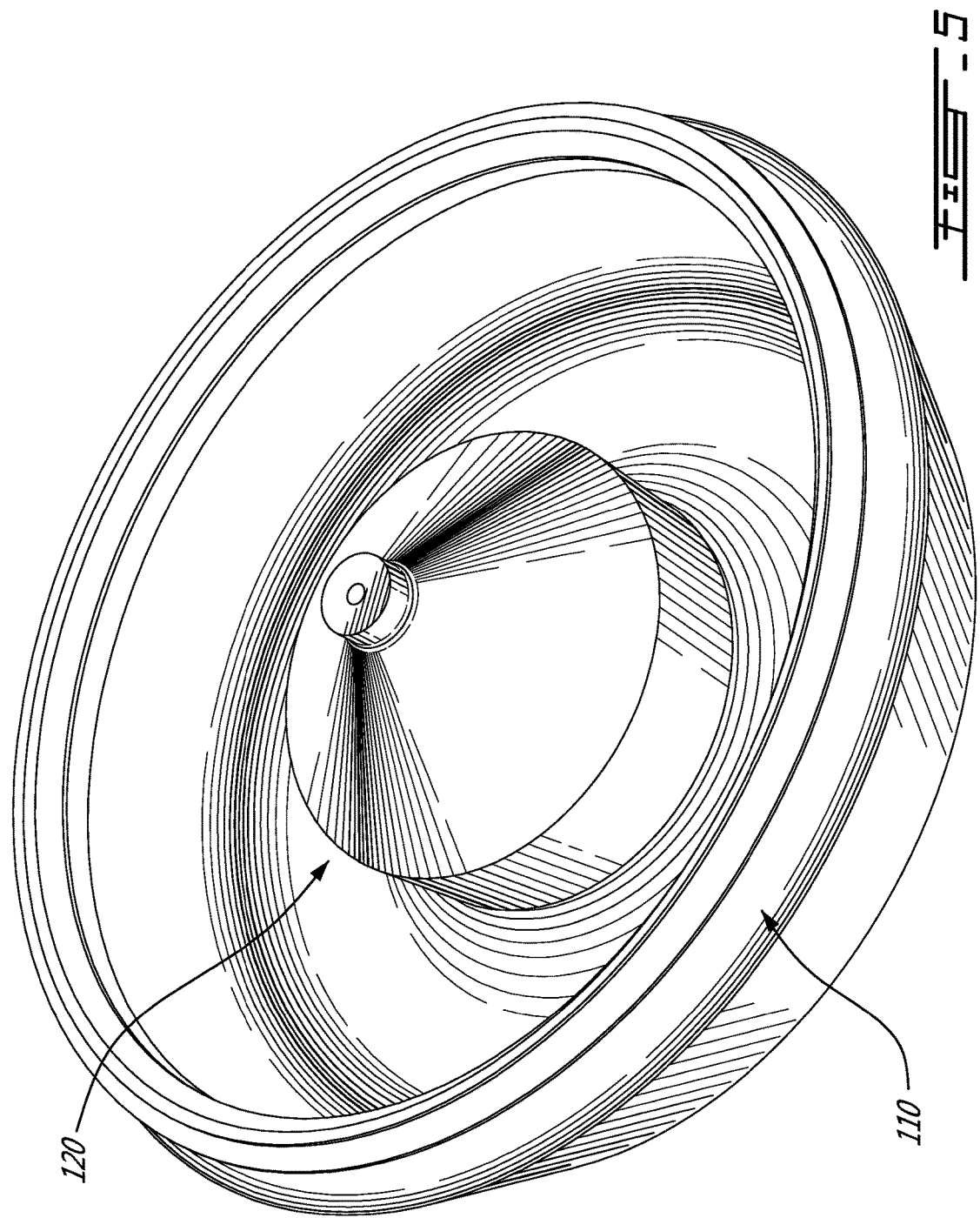

METAL PLATING METHOD AND APPARATUS

RELATED APPLICATIONS

This application is a divisional of U.S. patent application Ser. No. 13/076,812 filed on Mar. 31, 2011, the content of which is hereby incorporated by reference.

TECHNICAL FIELD

The application relates generally to plating and, more particularly, to an apparatus and a method suited for metal plating gas turbine engine components.

BACKGROUND OF THE ART

Conventional plating methods, such as electroplating, typically require that the component to be plated be immersed in a bath of plating solution and subject to an electric current. In a tank plating process, the surface areas of the component which do not require plating must be masked such that plating material is prevented from adhering to those areas of the component. The masking procedure is time consuming and labour intensive.

Brush plating can be used to reduce masking requirements. However, this method can require greater operator involvement. An operator dip the brush (the anode) and the component in a metal plating solution then applies it to the component to be plated (the cathode) while a relative movement is induced between the component and the brush. Only the areas of the component passing by the brush are being plated. The brush has tendency to deteriorate during the process causing the metal plating solution to prematurely degrade.

In view of the foregoing, there is a need for a new plating method and apparatus.

SUMMARY

In one aspect, there is provided a method of electroplating a localized area of a conductive component adapted to be charged as a cathode, the method comprising: circumscribing the area to be plated with an injection head carrying an anode, the injection head and the conductive component defining a plating chamber over the localized area to be plated, supplying a plating solution into said plating chamber, the plating solution being in conductive contact with the anode and the cathode; and applying an electric current to said anode.

In a second aspect, there is provided an electroplating apparatus for use in plating a desired surface area of a conductive component adapted to be charged as a cathode during a plating process, the apparatus comprising an injection head sized and shaped to circumscribe the desired surface area to be plated and isolate same from the remainder of the conductive component, the injection head and the desired surface area defining a localized plating chamber therebetween, an anode provided on the injection head and disposed to face the surface area to be plated when the injection head is positioned on the conductive component, a supply passage defined in said injection head for allowing a plating solution to be supplied into said localized plating chamber, and an electric contact for connecting the anode to a negative side of a source of current.

In a third aspect, there is provided a method for electroplating a localized area of a conductive component adapted to be charged as a cathode, the method comprising: forming a plating chamber over the localized area to be plated by aligning an injection head over the localized area and sealingly engaging the injection head on the conductive component, the injection head being sized and shaped to cover the localized area to be plated, the injection head supporting an anode in close facing proximity to the localized area when installed on the conductive component; injecting a plating solution inside the plating chamber, and subjecting the anode, the conductive component and the plating solution to an electric field.

DESCRIPTION OF THE DRAWINGS

Reference is now made to the accompanying figures, in which:

FIG. 1 is a perspective view of a turbine interstage case having an inner diametric surface requiring material application;

FIG. 2 is a partial cross-sectional view of a plating apparatus which can be used to metal plate the inner diametric surface of the turbine interstage case shown in FIG. 1;

FIG. 2A is an enlarged view of the portion of the plating apparatus contained in circle 2A-2A in FIG. 2;

FIG. 3 is a bottom view of an injection head of the plating apparatus shown in FIG. 2;

FIG. 4 is an enlarged perspective view of an outer combustor liner having an inner diametric surface to be plated; and FIG. 5 is a perspective view of a plating apparatus having an injection head specifically designed to fit on the outer combustor liner shown in FIG. 5 to permit localized plating of the inner diametric surface of the liner.

DETAILED DESCRIPTION OF THE PREFERRED EMBODIMENTS

FIG. 1 illustrates an example of a turbine interstage case 10 having an inner diameter 12 with a radially outwardly facing surface which needs to be plated. Such a case is typically made of a conductive metallic alloy.

FIG. 2 illustrates an embodiment of an electroplating apparatus 20 having an injection head specifically designed to permit localized plating of the radially outwardly facing surface of the inner diameter 12 of the turbine interstage case 10 shown in FIG. 1.

The injection head of the plating apparatus 20 may be provided in the form of a bell or hood having a generally hollow cylindrical body 22 shaped and sized to fit in a predetermined position within the hollow central portion of the turbine interstage case 10. It can be seen from FIG. 2 that the outside diameter of cylindrical body 22 generally corresponds to the inner diameter of the central hollow portion of the turbine interstage case 10, thereby providing for a relatively tight fit engagement between the injection head of the plating apparatus 20 and the turbine interstage case 10. This allows to precisely positioning the injection head relative to the surface to be plated. The cylindrical body 22 of the injection head has an axially extending cylindrical wall having an inner surface 24 and an outer surface 26. The cylindrical wall of the injection head 22 extends axially integrally from a conical top portion 28 to an open-ended component engaging end portion or base 30. As shown in FIG. 2, the diameter of the inner surface 24 is greater at the base 30 of the injection head, thereby providing for the formation of an axially downwardly facing inner shoulder 40. The end portion of the inner surface 24 which extends axially beyond shoulder 40 at the base 30 of the distribution head is adapted to closely surround the radially outwardly facing surface of the component inner diameter 12 to be plated to form therewith a plating chamber. In the illustrated example, the plating chamber takes the form of an annular plating gap 42 adapted to be filled with a plating solution. While the injection head is illustrated in FIG. 2 as having a bell shaped configuration, it is understood that the injection head of the plating apparatus 20 may be custom or tailor made to particularly fit the geometry of any specific part and to appropriately "sealably cover" the localized area to be plated. The expression "sealably covering" is herein intended to generally means that the plating apparatus 20 allows the creation a local environment for plating by covering a localized area to be plated so that the localized area to be plated is isolated from remaining parts of the component, thereby substantially eliminating the need for masking the surface of the component which does not required plating prior to initiating the plating process.

The injection head including the hollow cylindrical body 22 and the conical top portion 28 may be manufactured using a rapid prototyping method. For instance, a stereolithography process may be used to form the injection head. It is contemplated to use Fusion Deposition Modeling (FDM) to produce the injection head. According to one embodiment, the injection head is made from polycarbonate/acrylonitrile butadiene styrene (PC/ABS). Other materials are contemplated as well.

The conical top portion 28 is provided with a central inlet port 32 adapted to be connected to a source of a plating solution. The inlet port 32 may include a connector (not shown) which may be push fit into the end of a hose connectable to a plating solution reservoir. It is understood that any suitable connector compatible with the plating solution may be used.

The plating solution may comprise but is not limited to gold, silver, rhodium, chrome, copper, iron, zinc, tin, cadmium, nickel, cobalt, alloy such as Nickel-Cobalt, brass and solder. According to one example, the apparatus 10 is used to locally plate the interstage case 10 with a Nickel solution, such as a sulfamated nickel solution.

The inlet port 32 is connected in fluid flow communication with a manifold portion 34 internally formed within the top conical portion 28 and the upper end of the cylindrical body 22 of the injection head. The manifold portion 34 may be provided with baffles (not shown) for uniformly distributing the incoming flow of plating solution to a plurality of internal helicoidal supply passages 36 defined in the axially extending wall of the cylindrical body 22 of the injection head. A plurality of circumferentially distributed discharge holes 38 (FIG. 3) may be provided in the axially facing shoulder 40 to direct the plating solution from the internal passages 36 to the annular plating gap 42. As shown in FIG. 3, the discharge holes 38 may be angled to promote a circular flow of plating solution in the annular plating gap 42. The discharge holes 38 are axially aligned with the plating gap 42 and angled from the axial direction so as to impart a tangential component to the flow of plating solution in a plane normal to the axial direction. Any angle which provides adequate flow and coverage is acceptable. It has been found for this particular application that an angular range of 10 to 15 degrees promote sufficient flow circulation of the solution to enhance ion replenishment.

The apparatus 20 also comprises an anode 44. The anode 44 is carried on the inner surface 24 at the base 30 of the injection head. The anode 44 may be provided in the form of an annular electrode extending along the full circumference of the mouth of the base 30. As shown in FIG. 2, the anode 44 fully covers the portion of the inner surface 24 which extends axially beyond the inner shoulder 40. The anode 44 thus axially extends in the plating gap 42 in close opposed facing relationship with the surface to be plated once the injection is aligned and seated on the turbine interstage case 10. The injection head allows for the anode 44 to be positioned in close uniformly controlled distance to the radially outer surface of the inner diameter 12 for improved plating performance. The ring-shaped anode 44 provides 360 degrees coverage of the surface to be plated during 100% of the plating process, thereby obviating the need for moving the anode 44 relative to the case 10 during the plating process. The injection head and the case 10 can remain static during all of the plating cycle. Depending on plating thickness and the component geometry, the distance between the anode 44 and the radially outer surface of the inner diameter 12 of the case 10 may be comprised between about 0.035 inches to 0.070 inches.

The anode 44 may be an insoluble anode (i.e. an anode that resists dissolution during the plating process). The anode 44 is selected but not limited to carbon, lead, steel, platinum, titanium or other suitable anode material. The anode 44 and all the metallic parts of the plating apparatus 20 may be plated to avoid their degeneration during the plating process. According to a specific application, the anode 44 is platinum plated titanium alloy.

As shown in FIGS. 2 and 3, the plating apparatus 20 comprises a DC connector for providing direct current to the localized area to be plated. Specifically, the plating apparatus 20 may have an elongated bus bar 46 integrated or embedded in the wall of the cylindrical portion of the injection head. The bus bar 46 extends axially from an upper end of the cylindrical portion down to the anode 44 for conducting an electrical current thereto. The bus bar 46 is disposed radially outside of the internal passages 36. The bus bar 46 has a lower end portion 50 which is held in conductive contact with the anode 44. The opposed upper end portion 48 of the bus bar 46 is adapted to be connected to a bus lead 52 protruding through a radial opening 54 (FIG. 2) defined in an upper end portion of the cylindrical the body 22. The bus lead 52 may be connected to the positive terminal of a power supply or a rectifier (not shown) while the turbine interstage case 10 is connected to the negative terminal of the power supply.

Alternatively, The bus lead 52 may be connected to a source (not shown) of direct current or a rectifier and the turbine interstage case 10 may be grounded for providing direct current to the outer surface of the inner diameter 12 of the turbine interstage case 10 to be plated.

The injection head of the plating apparatus 20 is insulated with a non-conductive material for separating the anode 44 from other areas of the turbine interstage case 10 not to be plated. Any suitable material which is non-conductive and can withstand the solutions temperature and chemical attack without depreciable degradation could be used.

Although the design shown in FIGS. 1 to 3 is for a particular application, variations to the above described design are well accepted among a large family of various engine components. For instance, FIGS. 4 and 5 illustrate another potential application in which the injection head of a plating apparatus 120 is moulded or otherwise formed to mate with the inner diameter area 112 of an outer combustor liner 110. The injection head is shaped and sized to fit in a predetermined position over the combustor liner 110 in which the area to be plated is surrounded by the injection head with the anode of the injection head facing the area to be plated from one side of a locally formed plating chamber. Other applications are contemplated as well, FIGS. 4 and 5 being solely another possible application of the present concept.

In use, the injection head of the plating apparatus 20, 120 is aligned over the area to be plated and is then seated in position on the component 10, 110 so as to circumscribe the area to be plated and form a localized plating chamber thereover. The component 10, 110 and the anode 44 carried by the injection head are then respectively connected to the negative and positive sides of a power supply. The inlet 32 of the injection head is connected to a source of plating solution. Once the apparatus has been so installed, the plating solution flowing from the source of plating solution into the injection head is discharged into the plating gap 44 via the discharge holes 38 and the power supply is switched on to apply current with no further special attention required throughout its time cycle. Current can be applied after the solution has circulated and warmed the component to within 5 degrees Fahrenheit of the solutions operational temperature. The solution is allowed to flow over and out of the component after passing through the "effective gap" in which the act of plating exists. The solution is not contained but allowed to re-circulate back to the solution reservoir to be reheated and pumped back to the gap as required. The component being plated is positioned in a container (not shown) that has draining capabilities. This allows for the solution to be re-circulated back into the reservoir or tank to be reused. Upon reaching the desired plating thickness, current is stopped and solution flow is ended.

The injection head assembly can utilize features of the component to position the unit in its design. This is useful for maintaining the optimum gap between the anode and the cathode. An example could be another diameter on the component that is concentric to the one requiring plating to position the anode at a controlled gap. This can be designed in the injection head.

By so locally forming plating chamber over the area to be plated there is no longer a need for plating tank submersion of the component. The provision of 100% anode coverage of the surface to be plated provides for cycle time reduction. Operators involvement is also not required during duty cycle. It minimizes human exposure to the plating solution and gases. The isolation of the surface to be plated also eliminate the need for extensive or need of component masking. This contributes to significantly reduce the pre-process preparation of the parts to be plated. The controlled positioning of the anode relative to the surface to be plated contributes to improve efficiency and surface finish. Another advantage resides in the fact that no specialized tools or motorized equipment is needed to induce a relative movement between the anode and the part to be plated during the plating process. The anode and the part remain static during all the process. Contamination is virtually non existent. This enables full depletion of solution. Because of materials being used in the process and the fact that these materials do not degrade the solution absent of contaminations that would otherwise affect the process is eliminated.

The above description is meant to be exemplary only, and one skilled in the art will recognize that changes may be made to the embodiments described without departing from the scope of the invention disclosed. For example, the structure for supplying the plating solution to the plating gap can adopt various configurations. For instance, a simple fluid passage with one inlet and one outlet could be defined through the body of the injection head in order to direct a flow of plating solution into the plating chamber. Also the shape of the injection head is not limited to just round components but can also be adapted to irregular shapes and patterns and items without symmetry or formal arrangements. Still other modifications which fall within the scope of the present invention will be apparent to those skilled in the art, in light of a review of this disclosure, and such modifications are intended to fall within the appended claims.

What is claimed is:

1. An electroplating apparatus for use in plating a desired surface area of a conductive component adapted to be charged as a cathode during a plating process, the apparatus comprising an injection head sized and shaped to circumscribe the desired surface area to be plated and isolate the desired surface area from the remainder of the conductive component, the injection head having a non-conductive end having a geometry tailored to a geometry of the conductive component and configured to provide a male-female fitting engagement between the injection head and the conductive component, the geometry of the non-conductive end being configured to align the injection head in a predetermined position relative to the conductive component, the injection head and the desired surface area defining a localized plating chamber therebetween, an anode provided on the injection head and disposed to face the surface area to be plated when the injection head is positioned on the conductive component, a supply passage defined in said injection head and extending through a wall of the injection head between an inlet port connectable to a source of plating solution and a plurality of circumferentially distributed discharge holes for allowing a plating solution to be supplied into said localized plating chamber, and an electric contact for connecting the anode to a power supply.

2. The electroplating apparatus defined in claim 1, wherein the injection head has a non-conductive hood body adapted to cover the surface area to be plated, said non-conductive end defining a cavity to provide for the formation of said localized plating chamber between the desired surface area to be plated and the injection head, the anode extending over a wall of said cavity.

3. The electroplating apparatus defined in claim 2, wherein the anode extends along a full perimeter of said cavity.

4. The electroplating apparatus defined in claim 3, wherein the anode is provided in the form of an annular band encircling a distal end potion of said cavity.

5. The electroplating apparatus defined in claim 2, wherein the anode is provided in the form of an annular band encircling a distal end portion of said cavity, the circumferentially distributed discharge holes being disposed radially inside the annular band.

6. The electroplating apparatus defined in claim 5, wherein the circumferentially distributed discharge holes are angled to promote a circular flow of plating solution inside the cavity.

7. The electroplating apparatus defined in claim 2, wherein the supply passage comprises at least one helicoidal passage extending about said cavity for directing a flow of plating solution from said inlet port to said discharge holes.

8. The electroplating apparatus defined in claim 2, wherein the anode is an insoluble anode selected from carbon, lead, steel, platinum, titanium and other suitable insoluble anode material.

9. The electroplating apparatus defined in claim 2, wherein the non-conductive hood body is made of polycarbonate/acrylonitrile butadiene styrene.

10. The electroplating apparatus defined in claim 1, wherein the anode is provided at the non-conductive end of the injection head.

\* \* \* \* \*